(12) United States Patent
Han et al.

(10) Patent No.: US 11,581,726 B2
(45) Date of Patent: Feb. 14, 2023

(54) SELF-CHECK CHIP OF LEAKAGE PROTECTOR

(71) Applicant: ZHEJIANG UNIVERSITY, Zhejiang (CN)

(72) Inventors: Yan Han, Zhejiang (CN); Mohan Yu, Zhejiang (CN); Zhijie Cheng, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/610,282

(22) PCT Filed: Jun. 26, 2019

(86) PCT No.: PCT/CN2019/093002
§ 371 (c)(1),
(2) Date: Nov. 10, 2021

(87) PCT Pub. No.: WO2020/228104
PCT Pub. Date: Nov. 19, 2020

(65) Prior Publication Data
US 2022/0216688 A1 Jul. 7, 2022

(30) Foreign Application Priority Data
May 10, 2019 (CN) .......................... 201910406467.9

(51) Int. Cl.
*H02H 3/33* (2006.01)
*H02H 3/32* (2006.01)

(52) U.S. Cl.
CPC ............ *H02H 3/335* (2013.01); *H02H 3/325* (2013.01)

(58) Field of Classification Search
CPC ... G01R 19/16571; G01R 31/52; H02H 3/335
See application file for complete search history.

(56) References Cited

U.S. PATENT DOCUMENTS 5,600,524 A * 2/1997 Neiger ................... H02H 3/335
361/45
9,312,680 B2 * 4/2016 Li .......................... H02H 3/162
(Continued)

FOREIGN PATENT DOCUMENTS

CN      103887765      6/2014
CN      104795789      7/2015
(Continued)

OTHER PUBLICATIONS

International Search Report dated Feb. 18, 2020 issued in corresponding International Application No. PCT/CN2019/093002, with English translation.
(Continued)

*Primary Examiner* — Peter M Novak
(74) *Attorney, Agent, or Firm* — Onello & Mello, LLP

(57) ABSTRACT

The present disclosure discloses a self-check chip of a leakage protector. The self-check chip includes a power-on reset circuit, used for resetting the self-check chip after being powered-on; a reference voltage module, used for providing a reference voltage for a comparator module; a bias circuit, used for providing direct-current bias for the reference voltage module, the comparator module and a ring oscillator; the comparator module, used for monitoring an open-circuit condition of a trip coil and the change of a thyristor anode voltage and generating a power frequency clock; the ring oscillator, used for providing a clock for a counting module and a digital processing module; the counting module, used for generating a self-check signal, a leakage trigger signal, a PHASE pin detection signal and a reset signal of the counting module and the digital processing module; a trip enabling signal generation module; and the digital processing module.

4 Claims, 1 Drawing Sheet

(56) References Cited

U.S. PATENT DOCUMENTS

2007/0159740 A1\* 7/2007 Williams ................. H02H 3/33
                                                        361/42
2015/0280430 A1   10/2015 Huang
2018/0083434 A1\*  3/2018 Lim ....................... H02H 3/044

FOREIGN PATENT DOCUMENTS

| CN | 108666972 | 10/2018 |
| CN | 108736438 | 11/2018 |
| CN | 108761265 | 11/2018 |
| CN | 109149507 | 1/2019 |

OTHER PUBLICATIONS

Chinese Office Action dated Jan. 21, 2020 issued in corresponding Chinese Application No. 201910406467.9, with English translation.

\* cited by examiner

SELF-CHECK CHIP OF LEAKAGE PROTECTOR

CROSS REFERENCE TO RELATED APPLICATION(S)

The present application is a 371 national stage application of Patent Cooperation Treaty Application No. PCT/CN2019/093002 filed Jun. 26, 2019, entitled "SELF-CHECK CHIP OF LEAKAGE PROTECTOR", which in turn claims priority to Chinese Patent Application 201910406467.9 filed May 10, 2019, which are incorporated herein by reference in their entirety.

TECHNICAL FIELD

The present disclosure relates to the field of design of integrated circuits, and in particular to a self-check chip for regular self-checks of a leakage protector.

BACKGROUND ART

With increasing popularity of electrical appliances and diversification and complexity of power grid loads, countries and society have paid more and more attention to electrical safety. Leakage protectors have become indispensable auxiliary appliances in production and life. However, due to operation of the leakage protectors with faults, users lose protection from electric shocks and electric fires. Since regular checks of the existing leakage protectors require manual operation, power supplies are interrupted during the operation, and more than 90% of users do not perform periodic trip self-checks so that the risk of abnormal operation of the leakage protectors cannot be ignored.

SUMMARY

In order to overcome the shortcomings of the prior art, the present disclosure provides a self-check chip of a leakage protector.

A self-check chip of a leakage protector is characterized by including:

a power-on reset circuit, used for resetting the self-check chip after being powered-on;

a reference voltage module, used for providing a reference voltage for a comparator module;

a bias circuit, used for providing direct-current bias for the reference voltage module, the comparator module and a ring oscillator;

the comparator module, used for monitoring an open-circuit condition of a trip coil and the change of a thyristor anode voltage and generating a power frequency clock;

the ring oscillator, used for providing a clock for a counting module and a digital processing module;

the counting module, used for generating a self-check signal, a leakage trigger signal, a PHASE pin detection signal and a reset signal of the counting module and the digital processing module;

a trip enabling signal generation module, used for generating a trip enabling signal; and the digital processing module, used for determining whether or not a leakage protector chip, a mutual inductor coil, a thyristor, the trip coil and a PHASE pin function normally and outputting a termination signal if any of the leakage protector chip, the mutual inductor coil, the thyristor, the trip coil and the PHASE pin breaks down.

The counting module includes a 1 s counter, an 11 min counter, a 60 ms counter and a 100 ms counter.

The 1 s counter is used for performing a first self-check 1 second after being first powered-on; when a power-on reset signal is received, the 1 s counter is turned on, after the 1 s counter completes counting, a leakage trigger signal is generated to trigger a FAULT TEST pin to output a high level, and a triode transistor is turned on to generate an analog leakage current; a self-check signal is outputted at a high level and is always at a high level during the self-check period; and after the first self-check is completed, the 1 s counter is turned off until the power-on reset signal is generated again, and then the 1 s counter is turned on again.

The 11 min counter is used for performing a self-check every 11 minutes after the first self-check; when the 1 s counter outputs a rising edge signal, the 11 min counter is turned on, after the 11 min counter completes counting, a leakage trigger signal is generated to trigger the FAULT TEST pin to output a high level, and the triode transistor is turned on to generate an analog leakage current; a self-check signal is outputted at a high level and is always at a high level during the self-check period; and after the self-check is completed, the 11 min counter is reset.

The comparator module includes a first comparator, a second comparator and a third comparator; the first comparator is used for monitoring the open-circuit condition of the trip coil during the self-check period, and during the self-check period, if the trip coil and a live line are normally connected, the first comparator outputs a high level; the second comparator is used for monitoring the change of the thyristor anode voltage during the self-check period, and if the thyristor functions normally, the second comparator outputs a falling edge signal; and the third comparator compares a partial voltage level of the live line with an internal reference level to generate a square wave clock consistent with a power frequency, and the generated power frequency clock provides a clock for the 1 s counter and the 11 min counter.

The 100 ms counter is used for generating a PHASE pin detection signal.

The 60 ms counter is used for triggering a termination signal; when the 1 s counter and the 11 min counter output a self-check signal or the 100 ms counter outputs a PHASE pin detection signal, the 60 ms counter is turned on, and if the leakage protector chip, the mutual inductor coil, the thyristor, the trip coil and the PHASE pin function normally, the digital processing module generates a signal to reset and turn off the 60 ms counter; and if the leakage protector chip, the mutual inductor coil, the thyristor and the trip coil are abnormal in function, the 60 ms counter completes counting and triggers the digital processing module to output a termination signal.

[20] The trip enabling signal generation module is used for generating a trip enabling signal; during the self-check period, when the live line voltage is reduced from 50 V to 10 V, the trip enabling signal is outputted at a high level; and during the self-check period, only when the trip enabling signal is at a high level, a silicon controlled rectifier (SCR) signal can be outputted to drive the thyristor to be turned on.

The digital processing module is used for determining whether or not the leakage protector chip, the mutual inductor coil, the thyristor, the trip coil and the PHASE pin function normally and outputting a termination signal if any of the leakage protector chip, the mutual inductor coil, the thyristor, the trip coil and the PHASE pin breaks down; every 100 ms, the 100 ms counter generates a PHASE pin detection signal, the digital processing module detects an output signal of the first comparator, when the first comparator outputs a rising edge signal, the digital processing module outputs a reset signal to reset the 60 ms counter, and if the reset signal is not generated within 60 ms, the digital processing module outputs a termination signal after detecting a signal that the 60 ms counter completes counting; during the time outside the self-check period, the self-check signal is at a low level, if a trip signal of the leakage protector chip is outputted at a high level, the digital processing module triggers an SCR pin to output a high level, and that is to say, the SCR pin output is consistent with the trip signal of the leakage protector chip; during the self-check period, the self-check signal is at a high level, and only when the trip signal of the leakage protector chip and the trip enabling signal are at a high level at the same time, the digital processing module triggers the SCR pin to output a high level; when the self-check chip is in the self-check period, the self-check signal is at a high level, the FAULT TEST pin outputs a high level to turn on the triode transistor to generate an analog leakage current, when the trip enabling signal is at a low level, the SCR pin of the self-check chip is at a low level, the thyristor anode voltage and the live line voltage are the same, and the second comparator outputs a high level; when the live line voltage is reduced from 50 V to 10 V and the trip enabling signal is at a high level, if the leakage protector chip, the mutual inductor coil, the thyristor and the trip coil function normally, the mutual inductor coil induces the analog leakage current, the leakage protector chip processes an induced leakage signal, the trip signal of the leakage protector chip is outputted at a high level, the trip signal of the leakage protector chip and the trip enabling signal are at a high level at the same time, the SCR pin of the self-check chip is triggered to output a high level after determination by the digital processing module, the thyristor is turned on, the thyristor anode voltage is at a low level, the second comparator outputs a low level, and the digital processing module monitors the output signal of the second comparator and the output signal of the first comparator; if the second comparator outputs a falling edge signal and the first comparator outputs a rising edge signal, the digital processing module outputs a signal to reset and turn off the 60 ms counter, turn off the 1 s counter or reset the 11 min counter, and a reset self-check signal and the trip enabling signal trigger the FAULT TEST pin to output a low level to turn off the triode transistor; and if any of the leakage protector chip, the mutual inductor coil, the thyristor and the trip coil breaks down, the second comparator does not generate a falling edge signal, if the second comparator does not output a falling edge signal within 60 ms, the digital processing module does not generate a reset signal for resetting the 60 ms counter, and after the 60 ms counter completes counting, the digital processing module is triggered to output a termination signal.

Beneficial effects of the present disclosure: Regular self-checks of the leakage protector can be performed, and if a fault is found, a termination signal is output. During the self-check period, normal operation of load electrical appliances is not affected. The cost of a peripheral application circuit is relatively low, and market competitiveness is achieved.

BRIEF DESCRIPTION OF THE DRAWINGS

The above contents of the present disclosure and the following specific embodiments of the present disclosure will be better understood when read in conjunction with the accompanying drawings. It should be noted that the accompanying drawings are only used as examples of the claimed disclosure. In the accompanying drawings, same reference numerals refer to same or similar elements.

DETAILED DESCRIPTION OF THE EMBODIMENTS

Detailed features and advantages of the present disclosure are described in detail below in the specific embodiments, the contents are sufficient enough to enable any person skilled in the art to understand the technical contents of the present disclosure and carry out implementation accordingly, and any person skilled in the art can easily understand the related objectives and advantages of the present disclosure based on the specification, claims and accompanying drawings disclosed in this specification.

Figure 1:
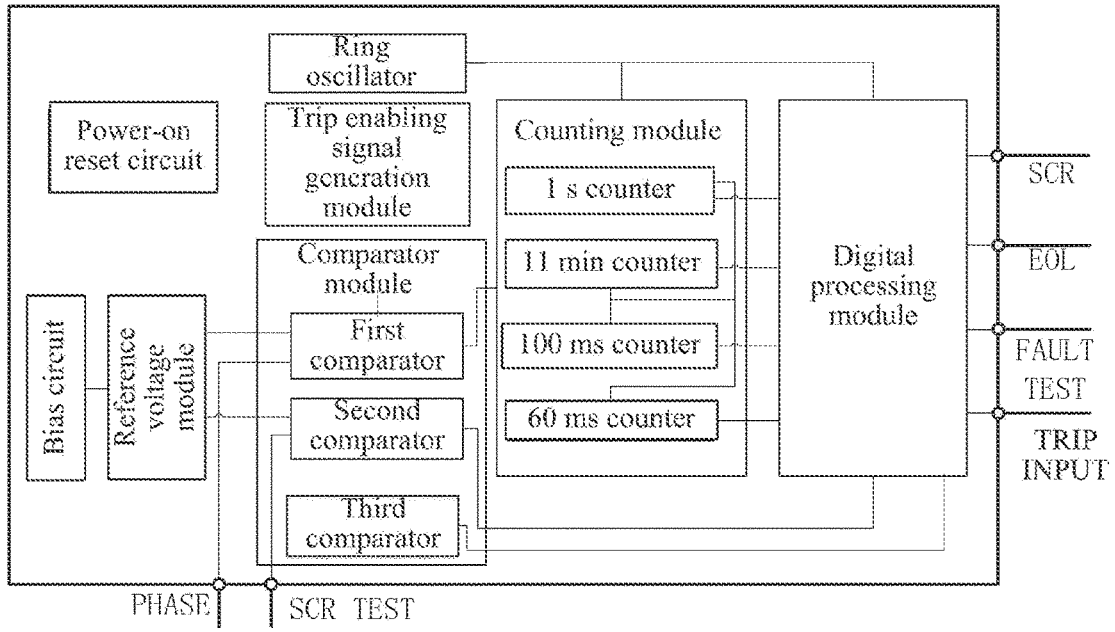
FIG. 1 is a structural diagram of a self-check chip of the present disclosure.

As shown in FIG. 1, a self-check chip includes:

a power-on reset circuit, used for resetting the self-check chip after being powered-on and turning on a 1 s counter;

a reference voltage module, used for providing a reference voltage for a comparator module:

a bias circuit, used for providing direct-current bias for the reference voltage module:

the comparator module, used for monitoring the phase of a live line voltage and the change of a thyristor anode voltage during a self-check period;

a ring oscillator, used for providing a clock for a counting module and a digital processing module;

the counting module, used for generating a self-check signal, a trip enabling signal, a leakage trigger signal, a thyristor anode monitoring signal and a reset signal of the counting module and the digital processing module; and the digital processing module, used for determining whether or not a leakage protector chip, a mutual inductor coil, a thyristor and a trip coil function normally and outputting a termination signal if any of the leakage protector chip, the mutual inductor coil, the thyristor and the trip coil breaks down.

Figure 2:
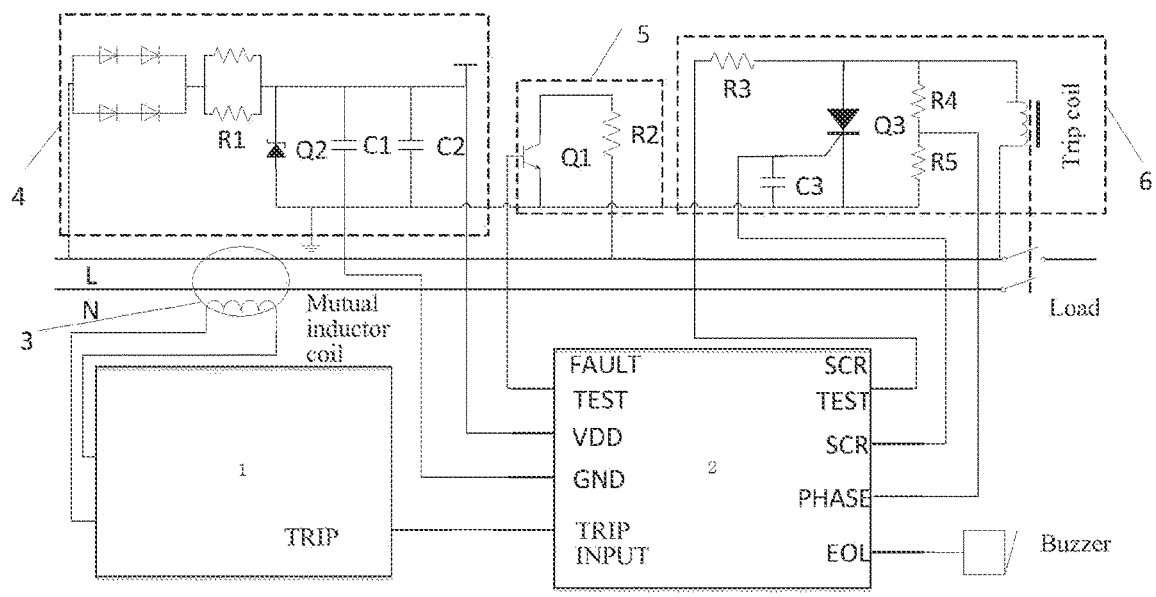
FIG. 2 is a diagram showing an application circuit of a self-check chip of the present disclosure.

FIG. 2 is a diagram showing an application circuit of a self-check chip of the present disclosure. The application circuit includes:

a leakage protector chip 1, used for processing a leakage signal:

a mutual inductor coil 3, used for inducing an analog leakage current:

a power supply circuit 4, used for supplying power for the leakage protector chip 1 and a self-check chip 2;

an analog leakage generation circuit 5, used for generating an analog leakage current;

a trip mechanism 6, mainly consisting of a trip coil and a thyristor; and the self-check chip 2, used for performing regular self-checks on the leakage protector chip, the mutual inductor coil, the thyristor, the trip coil and a PHASE pin of a leakage protector.

As shown in FIG. 2, the leakage protector chip 1 inputs a trip signal into the self-check chip 2, and the trip signal outputted by the leakage protector chip is processed by the self-check chip. During the self-check period, the digital processing module processes the trip signal outputted by the leakage protector chip to ensure that within a time range when an SCR pin outputs a high level, a maximum current produced by a trip coil branch is lower than a trip current, so that the trip mechanism is not driven to trip during the self-check period; and during the time outside the self-check period, when the self-check signal is at a low level, the SCR pin output is consistent with the trip signal outputted by the leakage protector chip. Table 1 is an SCR pin output truth table. Where, the self-check signal and the trip enabling signal are generated by the counting module of the self-check chip 2, and a TRIP signal is generated by the leakage protector chip 1.

TABLE 1

SCR pin output truth table

| Self-check signal | TRIP | Trip enabling signal | SCR |
|---|---|---|---|
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

An operation process of the self-check chip is described in detail below.

As shown in FIG. 1, after the chip is first powered-on, the power-on reset circuit generates a power-on reset signal to reset the self-check chip, and a 1 s counter and a 100 ms counter are turned on. After the 100 ms counter completes counting, a 60 ms counter is triggered to start detection of the PHASE pin; when a rising edge signal of the PHASE pin is detected, a 60 ms counter reset signal is outputted to reset the 60 ms counter, and if the rising edge signal of the PHASE pin is not detected, the 60 ms counter continues counting; and after the digital processing module detects a signal that the 60 ms counter completes counting, an alarm signal is generated, and the PHASE pin is detected every 100 ms. After the 1 s counter completes counting, a FAULT TEST pin is triggered to output a high level, and a triode transistor $Q_1$ in FIG. 2 is turned on to generate an analog leakage current; and the self-check signal is triggered to output a high level and is always at a high level during the self-check period, and when the self-check signal is received, the 60 ms counter is turned on. When the trip enabling signal is at a low level, the SCR pin is at a low level, an SCR TEST pin monitors the thyristor anode voltage, if the trip coil and a live line are normally connected, a partial voltage of the thyristor anode voltage is higher than a reference voltage, and a comparator outputs a high level; when the live line voltage is reduced from 50 V to 10 V, the trip enabling signal is outputted at a high level, after the 1 s counter completes counting, the FAULT TEST pin is triggered to output a high level to turn on the triode transistor to generate an analog leakage current, and if the mutual inductor coil and the leakage protector chip function normally, the trip signal of the leakage protector chip is outputted at a high level, at this time, the self-check signal, the trip signal of the leakage protector chip and the trip enabling signal are all at a high level, and the SCR pin is outputted at a high level; if the thyristor functions normally, the thyristor is turned on, the thyristor anode voltage is at a low level, the second comparator outputs a low level and outputs a falling edge signal, and during the period when the trip enabling signal is at a high level, if any of the trip coil, the thyristor, the mutual inductor coil and the leakage protector chip breaks down, the second comparator does not generate a falling edge signal; during the self-check period, the open-circuit condition of the trip coil is detected at the same time, a partial voltage of $R_5$ is compared with an internal reference level by using a first comparator, and if the trip coil is normally connected, the first comparator outputs a high level; when the digital processing module detects a rising edge signal of the first comparator and the falling edge signal of the second comparator, a turn-off signal is outputted to reset and turn off the 60 ms counter and the 1 s counter, and a reset self-check signal and the trip enabling signal trigger the FAULT TEST pin to output a low level to turn off the triode transistor $Q_1$; if the second comparator does not generate a falling edge signal during the period when the trip enabling signal is at a high level, any of the mutual inductor coil, the leakage protector chip, the thyristor and the trip coil breaks down; and within 60 ms, detection is repeated three times, and if the second comparator does not generate a falling edge signal within 60 ms, the 60 ms counter completes counting and outputs a signal to drive the digital processing module to generate a termination signal.

After the first self-check is completed, if the trip coil, the thyristor, the mutual inductor coil and the leakage protector chip function normally, a self-check is performed every 11 minutes after the first self-check, an 11 min counter completes counting once and then performs a self-check once, and the self-check process is repeated; and if any of the trip coil, the thyristor, the mutual inductor coil and the leakage protector chip breaks down, the self-check chip outputs a termination signal to disconnect a load from a power supply.

The terms and expressions used here are only used for description, and the present disclosure is not limited thereto. The use of these terms and expressions does not indicate that any equivalent features of illustrations and descriptions (or in part thereof) are excluded, and it should be recognized that various modifications should also be included in the scope of the claims. There are also other modifications, changes and replacements. Accordingly, all these equivalents should be included in the claims.

Similarly, it should be pointed out that although the present disclosure has been described with reference to the current specific embodiments, any person of ordinary skill in the art should recognize that the above embodiments are only used to illustrate the present disclosure, various equivalent changes or substitutions can be made without departing from the spirit of the present disclosure, and therefore, changes and modifications of the embodiments made within the essential spirit of the present disclosure shall fall within the scope of the claims of the present application.

What is claimed is:
1. A self-check chip of a leakage protector, comprising:
    a power-on reset circuit, used for resetting the self-check chip after being powered-on and turning on a 1 s counter;
    a reference voltage module, used for providing a reference voltage for a comparator module;
    a bias circuit, used for providing direct-current bias for the reference voltage module;
    the comparator module, used for monitoring a phase of a live line voltage during a self-check period and a change of a thyristor anode voltage;
    a ring oscillator, used for providing a clock for a counting module and a digital processing module;
    the counting module, used for generating a self-check signal, a trip enabling signal, a leakage trigger signal, a thyristor anode monitoring signal and a reset signal of the counting module and the digital processing module; and the digital processing module, used for determining whether or not a leakage protector chip, a mutual inductor coil, a thyristor, and a trip coil function normally and outputting a termination signal if any of the leakage protector chip, the mutual inductor coil, the thyristor, and the trip coil breaks down; wherein, the counting module comprises the 1 s counter, a 15 min counter, a 20 ms counter and a 60 ms counter;

the 1 s counter is used for performing a first self-check 1 second after being first powered-on; when a power-on reset signal is received, the 1 s counter is turned on, after the 1 s counter completes counting, the leakage trigger signal is generated to trigger a FAULT TEST pin to output a high level, and a triode transistor is turned on to generate an analog leakage current; the self-check signal is triggered and outputted at a high level and is always at a high level during the self-check period; and after the first self-check is completed, the 1 s counter is turned off until the power-on reset signal is generated again, and then the 1 s counter is turned on again;

the 15 min counter is used for performing a self-check every 15 minutes after the first self-check; when the 1 s counter outputs a rising edge signal, the 15 min counter is turned on, after the 15 min counter completes counting, the leakage trigger signal is generated to trigger the FAULT TEST pin to output a high level, and the triode transistor is turned on to generate the analog leakage current; the self-check signal is triggered and outputted at a high level and is always at a high level during the self-check period; and after the self-check is completed, the 15 min counter is reset;

the comparator module comprises a first comparator and a second comparator; the first comparator is used for monitoring the phase of the live line voltage during the self-check period;

the second comparator is used for monitoring the change of the thyristor anode voltage during the self-check period; when the live line voltage is in a positive half cycle, the first comparator outputs a positive level, and the first comparator outputs a rising edge pulse signal to turn on the 20 ms counter in cooperation with the 1 s counter and the 15 min counter; and when a counting time of the 20 ms counter is within a range of 9.75-9.9 ms, the second comparator monitors the change of the thyristor anode voltage, and outputs a signal to be input to the digital processing module for judgment.

2. The self-check chip according to claim 1, wherein the 20 ms counter is used for generating the self-check signal, the trip enabling signal, and the thyristor anode monitoring signal; when a signal outputted by the 1 s counter or the 15 min counter and a signal outputted by the first comparator are at a high level at the same time, the 20 ms counter is turned on; during a period of 9.75-9.9 ms, the trip enabling signal and the thyristor anode monitoring signal are outputted; after the 20 ms counter completes counting, the 20 ms counter, the trip enabling signal and the thyristor anode monitoring signal are reset.

3. The self-check chip according to claim 1, wherein the 60 ms counter is used for triggering the termination signal; when a signal outputted by the 1 s counter or the 15 min counter and a signal outputted by the first comparator are at a high level at the same time, the 60 ms counter is turned on; and after the 60 ms counter completes counting, the 60 ms counter triggers the digital processing module to output the termination signal.

4. The self-check chip according to claim 1, wherein the digital processing module is used for determining whether or not the leakage protector chip, the mutual inductor coil, the thyristor, and the trip coil function normally and outputting the termination signal if any of the leakage protector chip, the mutual inductor coil, the thyristor, and the trip coil breaks down; during the time outside the self-check period, the self-check signal is at a low level, if a trip signal of the leakage protector chip is outputted at a high level, the digital processing module triggers an SCR pin to output a high level, and that is to say, the SCR pin output is consistent with the trip signal of the leakage protector chip; during the self-check period, the self-check signal is at a high level, and only when the trip signal of the leakage protector chip and the trip enabling signal outputted by the counting module of the self-check chip are at a high level at the same time, the digital processing module triggers the SCR pin to output a high level; when the self-check chip is in the self-check period, the self-check signal is at a high level, the FAULT TEST pin outputs a high level to turn on the triode transistor and generate an analog leakage current, when a counting time of the 20 ms counter is within a range of 0-9.75 ms, the trip enabling signal is at a low level, the SCR pin of the self-check chip is at a low level, the thyristor anode voltage and the live line voltage are the same, and the second comparator outputs a high level; during a period of 9.75-9.9 ms, if the leakage protector chip, the mutual inductor coil, the thyristor and the trip coil function normally, the mutual inductor coil induces the analog leakage current, the leakage protector chip processes an induced leakage signal, the trip signal of the leakage protector chip is outputted at a high level, the trip signal of the leakage protector chip and the trip enabling signal of the counting module of the self-check chip are at a high level at the same time, the SCR pin of the self-check chip is triggered to output a high level after determination by the digital processing module, the thyristor is turned on, the thyristor anode voltage is at a low level, and the second comparator outputs a low level; during a period of 9.75-9.9 ms, the digital processing module monitors the output signal of the second comparator; if the second comparator outputs a falling edge signal, the digital processing module outputs a signal to reset and turn off the 20 ms counter and the 60 ms counter, turn off the 1 s counter or reset the 15 min counter, and a reset self-check signal, the trip enabling signal and the thyristor anode monitoring signal trigger the FAULT TEST pin to output a low level to turn off the triode transistor; and if any of the leakage protector chip, the mutual inductor coil, the thyristor and the trip coil breaks down, the second comparator does not generate a falling edge signal, if the second comparator does not output a falling edge signal within 60 ms, the digital processing module does not generate a reset signal for resetting the 60 ms counter, and after the 60 ms counter completes counting, the digital processing module is triggered to output the termination signal.

* * * * *